A. E. CUTLER.
PRESSURE GAUGE.
APPLICATION FILED OCT. 12, 1916.
1,416,794.
Patented May 23, 1922.
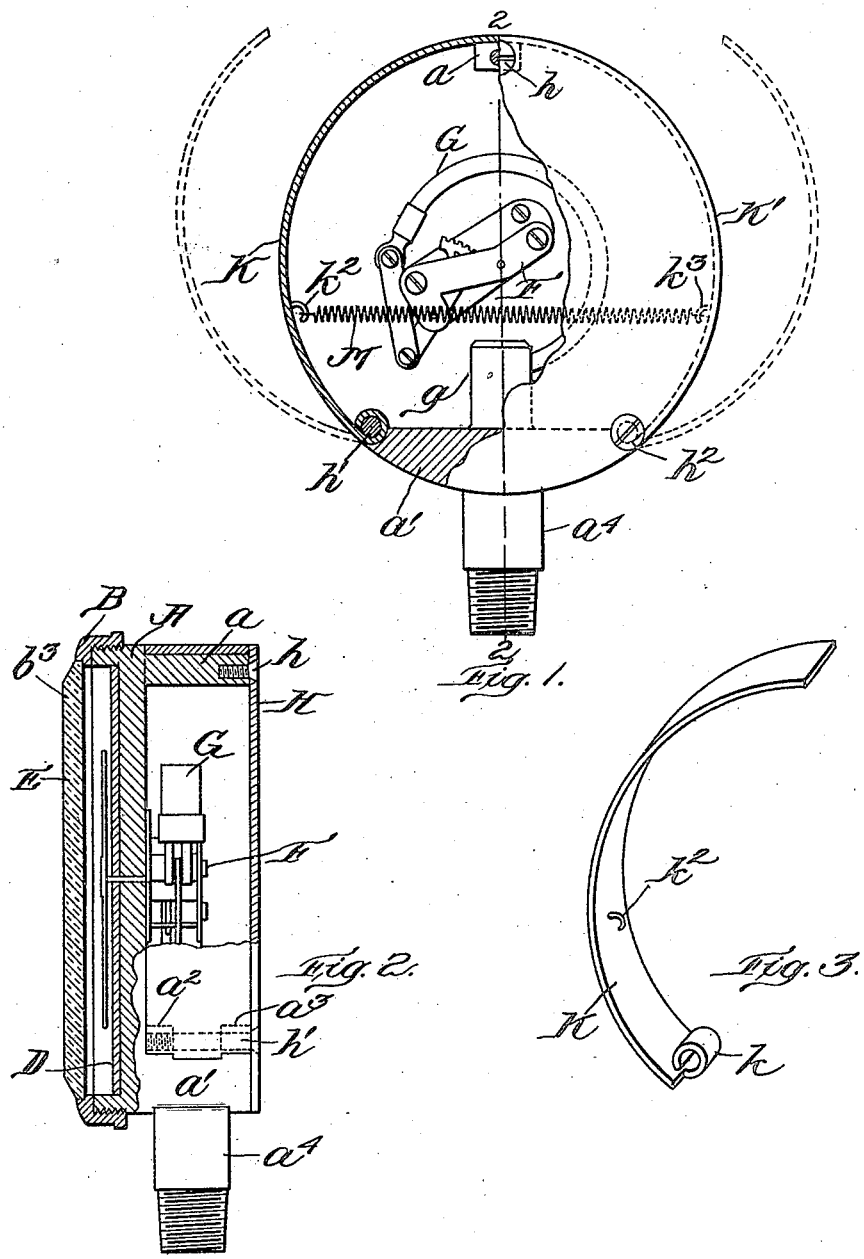

UNITED STATES PATENT OFFICE.

ARTHUR E. CUTLER, OF SOMERVILLE, MASSACHUSETTS, ASSIGNOR TO THE ASHTON VALVE COMPANY, OF BOSTON, MASSACHUSETTS, A CORPORATION OF MASSACHUSETTS.

PRESSURE GAUGE.

1,416,794.   Specification of Letters Patent.   Patented May 23, 1922.

Application filed October 12, 1916. Serial No. 125,298.

*To all whom it may concern:*

Be it known that I, ARTHUR E. CUTLER, of Somerville, in the county of Middlesex and State of Massachusetts, have invented a new and useful Pressure Gauge, of which the following is a specification.

The main object of my invention is to provide a pressure gauge which will be safe and which will not cause injury to persons in the vicinity of the gauge which injury has heretofore resulted from explosions, whether such explosions are caused by bursting of the pressure sensitive element or otherwise. Such explosions have frequently occured in gauges used in connection with oxygen apparatus when oil has been permitted to enter the apparatus.

Another object is to construct the device more cheaply and more durably than heretofore.

Other objects will be pointed out below.

A feature of my invention consists in providing a pressure outlet at the side of the gauge so that the explosion will exert its force sidewise and preferably upwardly or downwardly and so that any parts of the structure which may be loosened by the explosion will fly sidewise and preferably upwardly or downwardly so that any person in front of, or to the rear of, the gauge will be safe.

Another feature consists in making the attaching nipple integral with the casing which lessens the cost of manufacture very materially. One reason why this could not be done in the prior art is that with immovable side walls it was impossible to make a good joint for the Bourdon tube by soldering or the like particularly adjacent to the solid wall unless the nipple were separate from the casing.

Another feature is that I avoid a great deal of machine work heretofore necessary. My enclosing members are simply stamped out.

Another feature is that the attaching means for the back act as portions of the hinge for the movable side member.

Another feature is a curved movable side member which not only guides any flying parts but retards them.

Still another feature is that the movable side member or members may open up but will not fly off.

In the drawings:

Figure 1 is a sectional elevation of a gauge embodying my invention;

Figure 2 is an elevation partly in section on line 2—2 of Figure 1; and

Figure 3 is a perspective of one of the movable members.

The wall A has an integral lug $a$ interiorly threaded and an integral flange $a'$, the latter having two integral threaded bosses $a^2$ (only one being shown) and two integral bosses $a^3$ (only one being shown). The flange $a'$ has integral nipple $a^4$ to hold the device in place. The wall A is threaded to engage cap B carrying glass plate $b$. Indicating plate D is held to wall A in any suitable way. Indicating hand E is connected by any suitable mechanism such as F, to the Bourdon tube G which is soldered to boss $g$, the latter being integral with wall A.

The rear plate H is held in position by three screws, one of which being screw $h$ engaging lug $a$ and the others being screws $h'$ and $h^2$ passing through bosses $a^3$ and engaging bosses $a^2$. Pivoted on screws $h'$ and $h^2$ are members K and K' each made of sheet metal and having an integral bearing portion $k$ which not only hinges its member but enters between bosses $a^2$ and $a^3$ to prevent sidewise movement, these memebrs K and K' forming substantially all of the sides of the gauge. Suitably connected to members K and K' are hooks $k^2$ and $k^3$ connected by a spring M which normally holds members K and K' closed. If the spring should become disengaged the members K and K' would not fly off because they are retained by screws $h'$ and $h^2$.

While I have shown a single Bourdon tube I might use a double tube Bourdon spring or other pressure-sensitive means.

In case of any explosion the members K and K' will move outwardly against the action of spring M and the force of the explosion as well as any parts that might become free will be guided upwardly at the side of the gauge and will also be retarded by the curved form of said members.

What I claim is:

1. A pressure gauge casing having a front wall; a rear wall; and two members movable relatively to each other to provide an outlet intermediate of said walls while the latter are in their normal position, and a spring connecting said members to hold them normally closed.

2. A pressure gauge casing having a front wall; a rear wall; a member cooperating in the holding of said walls together; and a pivoted side member, said cooperating member serving as the pivot of said side member.

3. A pressure gauge casing having a fixed front wall; a fixed rear plate; two members forming the intermediate sides of the casing and being pivoted to the fixed part of the casing; and a spring normally holding said members in their closed position.

4. A pressure gauge casing having a fixed front wall; a fixed rear wall; an attaching nipple integral with one of said walls; two members forming the intermediate sides of the casing and being pivoted to the fixed part of the casing; and a spring normally holding said members in their closed position.

5. A pressure gauge casing having a front wall; a rear wall; two members movable to form an outlet in case of excess pressure and being intermediate of said walls and forming a portion of said casing; and resilient means for holding said members in their closed position.

6. A pressure gauge casing having a front wall; a rear wall; a member intermediate of said walls and attached to one of them but movable to provide automatically an outlet for excess pressure; and means between the walls to hold said member normally closed.

7. A pressure gauge comprising a fixed body consisting of a front wall, a rear wall spaced from the front wall, and a fixed connection between said walls; and two intermediate members each normally extending from one of said walls to the other to form with said walls a chamber, said members being pivotally attached to said body but adapted to swing outwardly under the force of excess pressure to provide a complete outlet for such explosion; and a spring connecting said intermediate members to normally hold them closed but permitting outward movement when the explosion occurs.

ARTHUR E. CUTLER.